(12) United States Patent
Zou

(10) Patent No.: US 12,444,806 B1
(45) Date of Patent: Oct. 14, 2025

(54) TOOL BATTERY PACK

(71) Applicant: Lawnix Technology (Nanjing) Co., Ltd., Jiangsu (CN)

(72) Inventor: Xiaoke Zou, Jiangsu (CN)

(73) Assignee: Lawnix Technology (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 19/241,850

(22) Filed: Jun. 18, 2025

(30) Foreign Application Priority Data

Feb. 28, 2025 (CN) .......................... 202520348339.4
Mar. 27, 2025 (CN) .......................... 202520561968.5
Apr. 1, 2025 (CN) ......................... 202520603105.X

(51) Int. Cl.
| | | |
|---|---|---|
| H01M 50/291 | (2021.01) | |
| H01M 10/613 | (2014.01) | |
| H01M 10/623 | (2014.01) | |
| H01M 10/643 | (2014.01) | |
| H01M 10/6562 | (2014.01) | |
| H01M 50/213 | (2021.01) | |
| H01M 50/24 | (2021.01) | |
| H01M 50/247 | (2021.01) | |
| H01M 50/342 | (2021.01) | |

(52) U.S. Cl.
CPC ....... *H01M 50/291* (2021.01); *H01M 10/613* (2015.04); *H01M 10/623* (2015.04); *H01M 10/6562* (2015.04); *H01M 50/213* (2021.01); *H01M 50/24* (2021.01); *H01M 50/247* (2021.01); *H01M 50/3425* (2021.01); *H01M 10/643* (2015.04); *H01M 2220/30* (2013.01)

(58) Field of Classification Search
None
See application file for complete search history.

(56) References Cited

U.S. PATENT DOCUMENTS

| | | | |
|---|---|---|---|
| 2014/0248519 A1* | 9/2014 | Nishikawa ............ | H01M 50/24 429/99 |
| 2020/0321576 A1* | 10/2020 | Nagahama ............ | H01M 50/24 |
| 2024/0120593 A1 | 4/2024 | Zhang et al. | |

FOREIGN PATENT DOCUMENTS

| | | |
|---|---|---|
| CN | 215834607 U | 2/2022 |
| CN | 115708249 A | 2/2023 |
| CN | 219696510 U | 9/2023 |
| CN | 219739093 U | 9/2023 |
| CN | 117855719 A | 4/2024 |
| CN | 118281474 A | 7/2024 |

* cited by examiner

*Primary Examiner* — Gregg Cantelmo
(74) *Attorney, Agent, or Firm* — IPro, PLLC

(57) ABSTRACT

Embodiments of the present application relate to the technical field of energy. A tool battery pack is provided. The tool battery pack includes: a waterproof layer, a battery cell holder, and a waterproof member, where the waterproof member is arranged at a second end of the battery cell holder and has a first end face away from the battery cell holder and a second end face closer to the battery cell holder; at least part of the waterproof layer is arranged between the second end face and the battery cell holder; and the second end face has a second convex face protruding toward an end face of a unit battery cell at an exposed hole.

20 Claims, 18 Drawing Sheets

TOOL BATTERY PACK

CROSS-REFERENCE TO RELATED APPLICATIONS

The present application claims priority to Chinese Patent Application No. 202520348339.4 filed with the China National Intellectual Property Administration on Feb. 28, 2025 and entitled "BATTERY PACK", Chinese Patent Application No. 202520561968.5 filed with the China National Intellectual Property Administration on Mar. 27, 2025 and entitled "TOOL BATTERY PACK", and Chinese Patent Application No. 202520603105.X filed with the China National Intellectual Property Administration on Apr. 1, 2025 and entitled "TOOL BATTERY PACK", which are incorporated herein by reference in their entirety.

TECHNICAL FIELD

Embodiments of the present application relate to the technical field of energy, and in particular, to a tool battery pack.

BACKGROUND

Tool battery packs in the conventional technology are typically composed of 1-parallel or 2-parallel battery cell assemblies. Unit battery cells in these battery packs are arranged in groups, and conductive electrodes are usually connected to battery cell end faces to establish a connection with a control board. To prevent short circuits due to electrical conduction between the unit battery cells, the battery cell end faces should be covered with a waterproof material, ensuring relative isolation between the unit battery cells. Conventional waterproofing methods typically involve applying the waterproof material and then allowing it to cure for a period of time before proceeding to subsequent assembly steps. As a result, the overall production efficiency is constrained by the curing time of the waterproof material. Meanwhile, conventional tools have relatively low power and charging/discharging requirements, resulting in a very low probability of thermal runaway in the battery packs. However, as tool power continues to increase, the higher charging/discharging rates lead to larger local temperature gradients, significantly raising the risk of thermal runaway. A battery cell undergoing thermal runaway will experience irreversible overheating, with its end face temperature rising sharply, which often causes high-pressure and high-temperature jet fires at the battery cell end face. If the battery cell undergoing thermal runaway is not contained, the surface temperature of an adjacent battery cell will be affected by thermal propagation therefrom, causing it to also undergo thermal runaway. This situation can be spread throughout the entire battery pack.

SUMMARY

Embodiments of the present application aim to provide a tool battery pack that solves problems such as waterproofing, enhances production efficiency, and enables rapid pressure relief during thermal runaway of a battery cell to prevent secondary thermal runaway triggering, thereby achieving a lightweight, efficient, and safely insulated solution.

A tool battery pack includes: a housing assembly, a battery cell assembly, an electrode holder, a control device, and a waterproof layer, where the housing assembly is configured to accommodate the battery cell assembly, the electrode holder, and the control device; the control device is connected to the electrode holder and the battery cell assembly; the battery cell assembly includes a battery cell holder and a unit battery cell mounted on the battery cell holder, where the battery cell holder has a first end and a second end, with an exposed hole formed in the second end; the waterproof layer is arranged at the second end of the battery cell holder; and the tool battery pack further includes a waterproof member and a positioning member configured to connect the waterproof member to the battery cell holder, where the waterproof member is arranged at the second end of the battery cell holder and has a first end face away from the battery cell holder and a second end face closer to the battery cell holder, at least part of the waterproof layer is arranged between the second end face and the battery cell holder, and the second end face has a second convex face protruding toward an end face of the unit battery cell at the exposed hole. Conventional waterproofing methods typically involve applying the waterproof material and then allowing it to cure for a period of time before proceeding to subsequent assembly steps. As a result, the overall production efficiency is constrained by the curing time of the waterproof material. In contrast, by employing the waterproof member with the second convex face, the present application achieves dual benefits: on one hand, the waterproof member allows subsequent assembly steps to proceed immediately after the waterproof layer covers the battery cell holder, eliminating the need to wait for the waterproof layer to dry, which significantly enhances production line efficiency, reduces waiting time, and improves production flexibility and responsiveness; on the other hand, the second convex face ensures that the waterproof member compresses the waterproof layer, creating a tight seal against the battery cell end face, which protects the waterproof layer against peeling off from the battery cell end face due to vibration or abrasion, and meanwhile, the waterproof layer on the battery cell end face at the exposed hole is kept thin, enabling an abnormal unit battery cell to rapidly break the thin area, thereby providing a safe pressure relief mechanism, preventing impact on adjacent unit battery cells or battery cell assemblies, and avoiding cascading thermal runaway events.

In an embodiment, the first end face has a first convex face protruding toward the end face of the unit battery cell at the exposed hole, forming a defined "weak interface" between the waterproof layer and the battery cell, as well as at the exposed hole of the waterproof member, through a minimum gap of 0.1 mm. When internal pressure rises, stress will be concentrated in this area first, accelerating tearing or rupture of the waterproof layer. During abnormal overheating conditions, the battery cell typically exhibits high-pressure and high-temperature jet fires at the first end face. In such cases, an abnormal unit battery cell can rapidly break the thin area of the waterproof layer, thereby providing a safe pressure relief mechanism that prevents impact on adjacent unit battery cells or battery cell assemblies and avoids cascading thermal runaway events.

In an embodiment, a distance B between the first convex face and the second end face is greater than 0.3 mm and less than or equal to 3 mm. By setting a range of the distance B between the first convex face and the second end face, the thickness of the thin area can be optimally controlled for more reliable breakage while effectively preventing piercing of the waterproof layer due to improper operations during a compression process. This design ensures waterproof protection while providing a well-defined and controlled pressure relief channel for abnormal conditions such as high pressure and high temperature. Furthermore, by defining the range of the distance B, the thickness of the thin area can remain controllable and consistent during manufacturing, which not only ensures quality control in mass production but also enhances process stability.

In an embodiment, the unit battery cell has a first battery cell end face and a second battery cell end face, where the first battery cell end face has a positive end face, and a distance A2 between the second convex face and the positive end face is greater than or equal to 0.1 mm. By defining a range of the distance A2, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A2, the thickness of the thin area can remain controllable and consistent during manufacturing, which not only ensures quality control in mass production but also enhances process stability.

In an embodiment, the distance A2 between the second convex face and the positive end face is greater than or equal to 0.1 mm and less than 2 mm. By defining a range of the distance A2, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A2, the thickness of the thin area can remain controllable and consistent during manufacturing, which not only ensures quality control in mass production and enhances process stability, but also prevents an excessive distance that would prolong external liquid intrusion pathways. The design improves the waterproof layer's uniform pressure distribution capability while maintaining a safe distance, simultaneously reducing overall dimensions to facilitate battery pack lightweight and compact design.

In an embodiment, the distance A2 between the second convex face and the positive end face is greater than or equal to 0.3 mm and less than 1.2 mm. The narrow-distance design ensures more uniform contact between the waterproof member and the battery cell end face, significantly improving long-term leak-proof performance. By precisely controlling the distance, it reduces fatigue damage to the waterproof layer caused by temperature fluctuations or mechanical shocks, thereby extending its service life. By defining a range of the distance A2, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A2, the thickness of the thin area can remain controllable and consistent during manufacturing, which not only ensures quality control in mass production and enhances process stability, but also prevents an excessive distance that would prolong external liquid intrusion pathways. The design improves the waterproof layer's uniform pressure distribution capability while maintaining a safe distance, simultaneously reducing overall dimensions to facilitate battery pack lightweight and compact design.

In an embodiment, the positive end face is provided with a cap end face, and a distance A1 between the second convex face and the cap end face is greater than or equal to 0.1 mm. By defining a range of the distance A1, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A1, the thickness of the thin area can remain controllable and consistent during manufacturing, which not only ensures quality control in mass production but also enhances process stability.

In an embodiment, the distance A1 between the second convex face and the cap end face is greater than or equal to 0.1 mm and less than 2 mm. By defining a range of the distance A1, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A1, the thickness of the thin area can remain controllable and consistent during manufacturing, which not only ensures quality control in mass production and enhances process stability, but also prevents an excessive distance that would prolong external liquid intrusion pathways. The design improves the waterproof layer's uniform pressure distribution capability while maintaining a safe distance, simultaneously reducing overall dimensions to facilitate battery pack lightweight and compact design.

In an embodiment, the distance A1 between the second convex face and the cap end face is greater than or equal to 0.5 mm and less than 1.5 mm. By defining a range of the distance A1, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A1, the thickness of the thin area can remain controllable and consistent during manufacturing, which not only ensures quality control in mass production and enhances process stability, but also prevents an excessive distance that would prolong external liquid intrusion pathways. The design improves the waterproof layer's uniform pressure distribution capability while maintaining a safety distance, simultaneously reducing overall dimensions to facilitate battery pack lightweight and compact design.

In an embodiment, the distance A1 between the second convex face and the cap end face is greater than or equal to 0.3 mm and less than 1.2 mm. The narrow-distance design ensures more uniform contact between the waterproof member and the battery cell end face, significantly improving long-term leak-proof performance. By precisely controlling the distance, it reduces fatigue damage to the waterproof layer caused by temperature fluctuations or mechanical shocks, thereby extending its service life. By defining a range of the distance A1, the thickness of the thin area of the waterproof layer can be optimally controlled to maintain effective waterproof protection while providing a well-defined and controlled pressure relief channel for abnormal conditions such as high pressure and high temperature. Furthermore, by defining the range of the distance A1, the thickness of the thin area can remain controllable and consistent during manufacturing, which not only ensures quality control in mass production and enhances process stability, but also prevents an excessive distance that would prolong external liquid intrusion pathways. The design improves the waterproof layer's uniform pressure distribution capability while maintaining a safe distance, simultaneously reducing overall dimensions to facilitate battery pack lightweight and compact design.

In an embodiment, the waterproof member is made of a non-metal material with a thermal softening temperature higher than or equal to 90° C. By configuring the waterproof member to be made of a non-metal material with a thermal softening temperature higher than or equal to 90° C., it can autonomously soften during an abnormal temperature rise of a unit battery cell, enabling the abnormal unit battery cell to rapidly break the thin area of the waterproof layer, thereby providing a safe pressure relief mechanism that prevents impact on adjacent unit battery cells or battery cell assemblies and avoids cascading thermal runaway events; meanwhile, during a normal temperature rise of the unit battery cell, it provides stable and effective waterproof performance unaffected by the temperature rise.

In an embodiment, the waterproof member is made of any one of acrylonitrile butadiene styrene, polycarbonate, polypropylene, polyethylene, polyamide, or glass fiber. By configuring the waterproof member to be made of any one of acrylonitrile butadiene styrene, polycarbonate, polypropylene, polyethylene, polyamide, or glass fiber, it can autonomously soften during an abnormal temperature rise of a unit battery cell, enabling the abnormal unit battery cell to rapidly break the thin area of the waterproof layer, thereby providing a safe pressure relief mechanism that prevents impact on adjacent unit battery cells or battery cell assemblies and avoids cascading thermal runaway events; meanwhile, during a normal temperature rise of the unit battery cell, it provides stable and effective waterproof performance unaffected by the temperature rise.

In an embodiment, the waterproof member has a thickness greater than or equal to 0.3 mm and less than or equal to 3 mm. By setting the thickness of the waterproof member, the thickness of the thin area can be optimally controlled for more reliable breakage; meanwhile, the thickness of the thin area can remain controllable and consistent during manufacturing, which not only ensures quality control in mass production but also enhances process stability.

In an embodiment, the waterproof member is a waterproof plate with uneven thickness, and the thickness of a part of the waterproof member at the exposed hole is less than or equal to that of a part of the waterproof member outside the exposed hole. By configuring the waterproof member to be thin at the exposed hole, during abnormal overheating conditions, the battery cell typically exhibits high-pressure and high-temperature jet fires at the first end face. In such cases, an abnormal unit battery cell can rapidly break the thin area of the waterproof layer, thereby providing a safe pressure relief mechanism that prevents impact on adjacent unit battery cells or battery cell assemblies and avoids cascading thermal runaway events.

In an embodiment, the first battery cell end face further includes a negative end face; an isolating member is arranged between the negative end face and the positive end face; and a first edge, which is an edge of the negative end face closer to a central axis of the unit battery cell, is exposed from the exposed hole, and a projection distance C between the first edge and an inner edge of the exposed hole is greater than or equal to 0.1 mm. By setting the distance between the exposed hole and the first edge, the waterproof layer can directly cover the positive and negative end faces, which not only structurally enhances electrical isolation but also enables the waterproof layer to cover the negative end face and the isolating member. Once the isolating member becomes damaged or fails due to aging, the waterproof layer serves as an additional barrier, preventing moisture ingress into the interior of the battery cell. Furthermore, by covering both the negative end face and the exposed hole, the waterproof layer prevents moisture from penetrating through assembly gaps of an accommodating slot into the battery cell end face along the length of the battery cell, thereby preventing any contact between the moisture and the positive and negative end faces to avoid potential short-circuit risks.

In an embodiment, an inner height D of the exposed hole is greater than or equal to 0.5 mm and less than or equal to 2.5 mm, which can provide effective support strength for the unit battery cell, thereby preventing positional displacement of the unit battery cell caused by vibration or other external forces during normal use and enhancing the overall mechanical stability and safety of the battery pack. Additionally, keeping the height D less than or equal to 2.5 mm helps reinforce the support strength while avoiding unnecessary material usage, thereby optimizing the weight of the battery pack and further improving energy efficiency and endurance. This height range also ensures efficient utilization of the internal space within the battery cell. While ensuring strong support, the well-designed inner height of the exposed hole avoids unnecessary occupation of the battery pack's effective space, allowing the battery pack to maximize capacity and energy density within a limited space.

In an embodiment, the battery cell holder is provided with an accommodating slot; the exposed hole extending through the battery cell holder is formed at an end of the accommodating slot; an inner area of the exposed hole is less than a cross-sectional area of the accommodating slot parallel to the exposed hole; and an area of the exposed hole is less than a maximum area of the first battery cell end face extending into the accommodating slot, thereby enabling effective positioning.

In an embodiment, the waterproof layer is arranged at the second end of the battery cell holder through either a potting process or a vacuum deposition process, and covers the first and second battery cell end faces of the unit battery cell, thereby avoiding short-circuit risks caused by contact between the first and second battery cell end faces and external moisture.

In an embodiment, the positioning member is a positioning hole, and the battery cell holder is provided with a positioning post configured to fit with the positioning hole, where the positioning post has a size ranging from 1 mm to 10 mm, thereby enabling effective positioning.

In an embodiment, the positioning member is a positioning post with a size ranging from 0.5 mm to 2 mm, and the battery cell holder is provided with a positioning hole configured to fit with the positioning post, where part or all of the positioning post is accommodated in the positioning hole, thereby enabling effective positioning.

BRIEF DESCRIPTION OF THE DRAWINGS

One or more embodiments are exemplarily described with reference to the accompanying drawings, but these exemplary descriptions do not constitute limitations on the embodiments.

DETAILED DESCRIPTION

Figure 1:
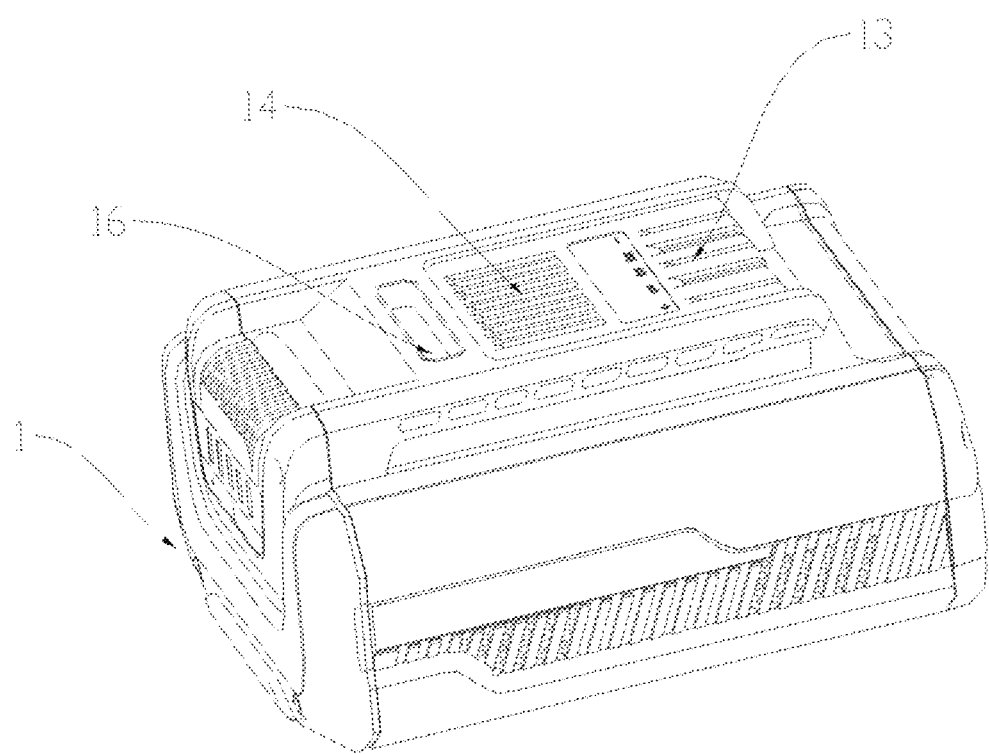
FIG. 1 is a top-down perspective view of a tool battery pack provided in an embodiment of the present application.
Figure 2:
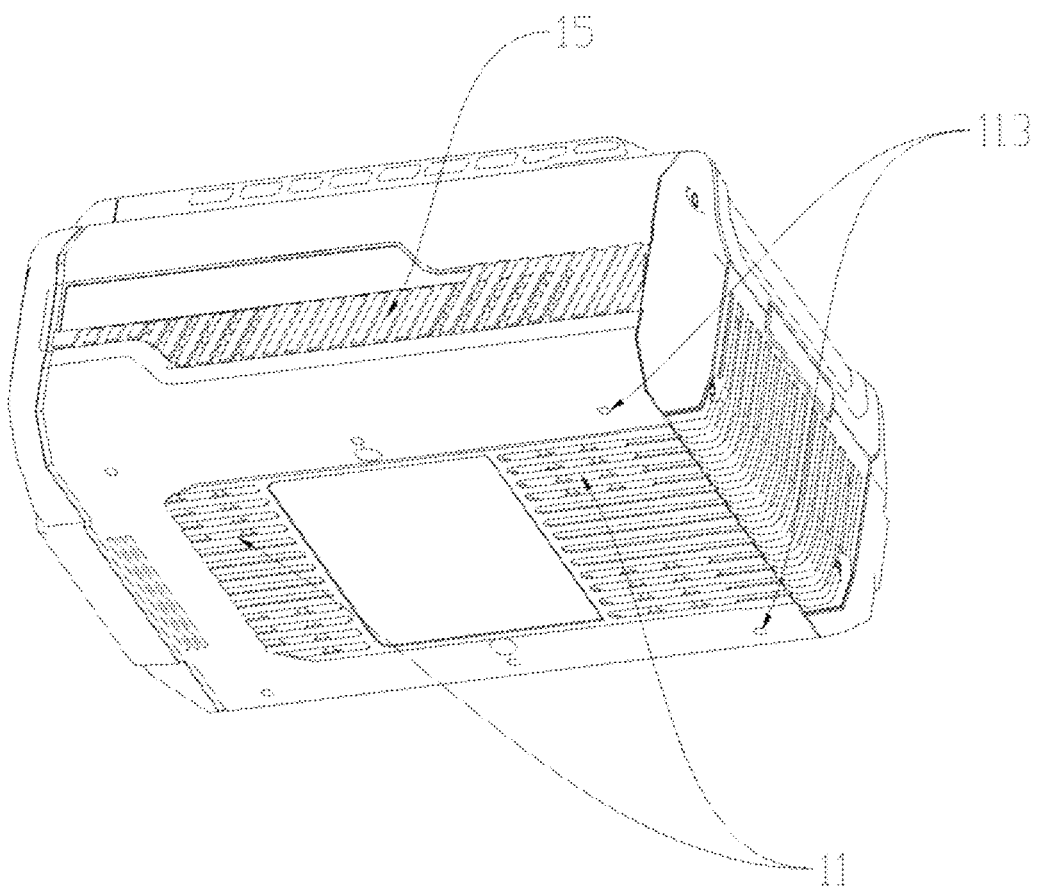
FIG. 2 is a bottom-up perspective view of a tool battery pack provided in an embodiment of the present application.
Figure 3:
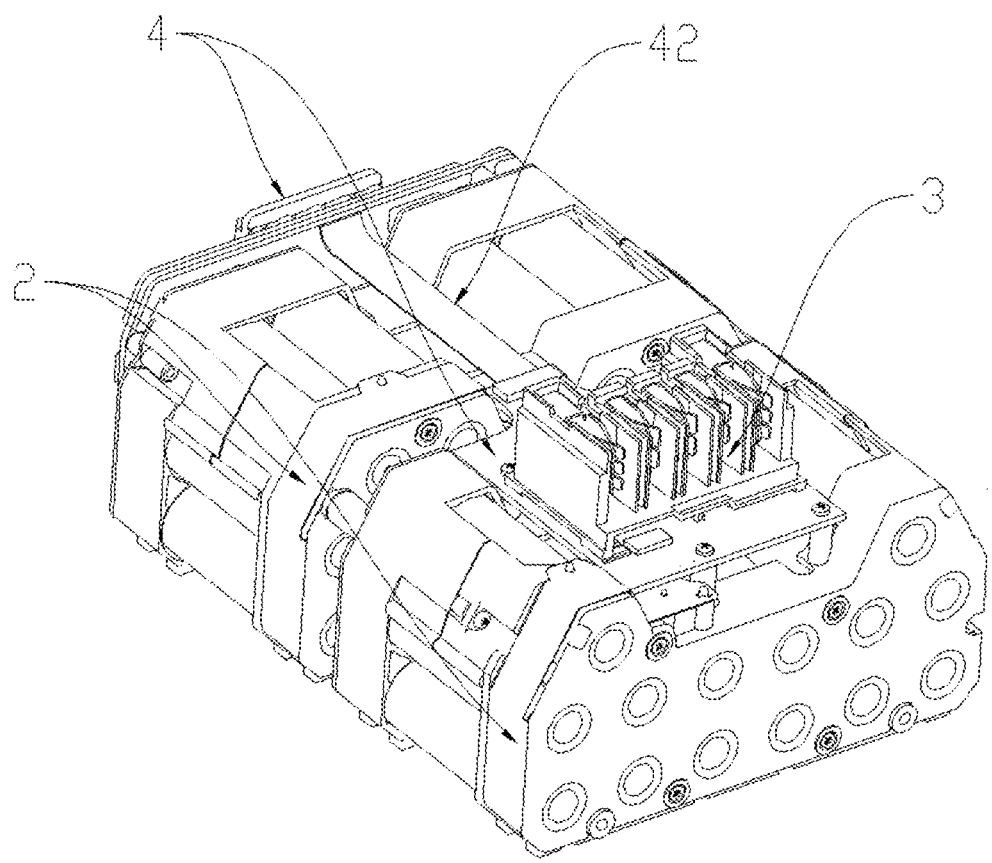
FIG. 3 is a schematic diagram of an internal structure of a tool battery pack provided in an embodiment of the present application.

To make the objectives, technical solutions, and advantages of the embodiments of the present application clearer, the embodiments of the present application will be described in detail with reference to the accompanying drawings. However, it may be understood by those of ordinary skill in the art that in the embodiments of the present application, many technical details are proposed for readers to better understand the present application. Even without these technical details and various changes and modifications based on the following embodiments, the technical solutions claimed to be protected by the present application may also be implemented. The following embodiments are divided for ease of description, and shall not be construed as any limitation on the implementation manners of the present application. The embodiments may be combined with each other and cross-referenced on the premise of no contradiction.

As can be seen from the background, tool battery packs in the conventional technology are typically composed of 1-parallel or 2-parallel battery cell assemblies. Unit battery cells in these battery packs are arranged in groups, and conductive electrodes are usually connected to battery cell end faces to establish a connection with a control board. To prevent short circuits due to electrical conduction between the unit battery cells, the battery cell end faces should be covered with a waterproof material, ensuring relative isolation between the unit battery cells. Conventional waterproofing methods typically involve applying the waterproof material and then allowing it to cure for a period of time before proceeding to subsequent assembly steps. As a result, the overall production efficiency is constrained by the curing time of the waterproof material. Meanwhile, conventional tools have relatively low power and charging/discharging requirements, resulting in a very low probability of thermal runaway in the battery packs. However, as tool power continues to increase, the higher charging/discharging rates lead to larger local temperature gradients, significantly raising the risk of thermal runaway. A battery cell undergoing thermal runaway will experience irreversible overheating, with its end face temperature rising sharply, which often causes high-pressure and high-temperature jet fires at the battery cell end face. If the battery cell undergoing thermal runaway is not contained, the surface temperature of an adjacent battery cell will be affected by thermal propagation therefrom, causing it to also undergo thermal runaway. This situation can be spread throughout the entire battery pack.

During 30 A discharging of a 60V unit battery cell 21, the temperature rise of the battery cell end face reaches about 60° C. As current intensity increases, the temperature rise of the battery cell end face also escalates. During charging/discharging, if the temperature of the battery cell end face continues rising and reaches 100° C., the surface temperature of an adjacent battery cell will progressively rise following the temperature rise of the battery cell undergoing thermal runaway. When the battery cell undergoing thermal runaway reaches 283.6° C., it will experience irreversible overheating, with its end face temperature rising sharply, which often causes high-pressure and high-temperature jet fires at the first battery cell end face 211. If the battery cell undergoing thermal runaway is not contained, the surface temperature of the adjacent battery cell will be affected by thermal propagation therefrom, causing them to also undergo thermal runaway. This situation can be spread throughout the entire battery pack.

Through research on the internal temperature characteristics of battery cells undergoing overheating/thermal runaway in existing tool battery packs and on the thermal transfer characteristics of the entire battery packs, the aforementioned drawbacks are recognized and their root causes are analyzed. By ingeniously implementing a waterproof member, optimizing structural design, and selecting suitable materials, the present application solves problems in tool battery packs such as bulky structure and low production efficiency while enabling rapid pressure relief during thermal runaway of a battery cell to prevent secondary thermal runaway triggering, thereby achieving a lightweight, efficient, and safely insulated solution.

Embodiments of the present application will be described below in detail with reference to the accompanying drawings.

Referring to FIGS. 1-18, a tool battery pack includes a housing assembly 1, a battery cell assembly 2, an electrode holder 3, and a control device 4, where the housing assembly 1 is configured to accommodate the battery cell assembly 2, the electrode holder 3, and the control device 4; the control device 4 is connected to the electrode holder 3 and the battery cell assembly 2; the housing assembly 1 includes a first heat dissipation vent 11, a holder mounting base (not shown), an opening 13, and a second heat dissipation vent 14, where the opening 13 is arranged on the housing assembly 1 corresponding to the electrode holder 3 to allow an electrode to pass through and connect with the electrode holder 3, the second heat dissipation vent 14 is arranged on the side of the battery pack where the opening 13 is located, and the first heat dissipation vent 11 and the second heat dissipation vent 14 are oppositely arranged on two sides of the housing assembly 1, with the first heat dissipation vent 11 serving as an air inlet and the second heat dissipation vent 14 as an air outlet, which creates a linear airflow channel between the first heat dissipation vent 11 and the second heat dissipation vent 14, thereby enabling more efficient airflow through the battery pack, ensuring that the internal temperature of the battery pack remains within a safe range, significantly improving heat dissipation efficiency, and reducing the risk of explosion due to battery cell overheating; the holder mounting base (not shown) is arranged on at least one interior side of the housing assembly 1 to secure the battery cell assembly 2, thereby preventing the battery cell holder 22 from displacement within the housing assembly 1; and a total area of the first heat dissipation vent 11 exceeds that of the second heat dissipation vent 14 and airflow enters the housing assembly 1 through the first heat dissipation vent 11 and exits through the second heat dissipation vent 14, thereby facilitating intake of more cooling air through the larger first heat dissipation vent 11 and ensuring sufficient contact between the cooling air and the battery cell assembly 2.

In an embodiment, the housing assembly 1 further includes a third heat dissipation vent 15 positioned on any side of the housing assembly 1 other than those provided with the first heat dissipation vent 11 and the second heat dissipation vent 14, allowing airflow on the side to enter the battery pack, and the airflow through the third heat dissipation vent 15 converges with that through the first heat dissipation vent 11 to form a combined airflow that is discharged through the second heat dissipation vent 14. By providing the third heat dissipation vent 15, it enables multi-directional airflow intake into the battery pack, promotes more uniform heat distribution across the battery cell assembly 2, and prevents local overheating. The convergence of internal airflow ensures comprehensive and efficient airflow distribution across the surface of the battery cell, maintaining overall thermal equilibrium while further enhancing the battery pack's heat dissipation capability. This design not only enhances air circulation and improves internal heat exchange efficiency but also ensures reliable heat dissipation. Even if one heat dissipation vent is partially blocked by external factors, the battery pack can still achieve sufficient heat dissipation through another inlet. Such a multi-inlet/single-outlet airflow configuration facilitates faster surface temperature reduction of the battery cell.

In an embodiment, the housing assembly 1 further includes third heat dissipation vents 15 positioned on any two opposite sides of the housing assembly 1 other than those provided with the first heat dissipation vent 11 and the second heat dissipation vent 14, allowing airflow on the opposite sides to enter the battery pack, and the airflow through the third heat dissipation vents 15 converges with that through the first heat dissipation vent 11 to form a combined airflow that is discharged through the second heat dissipation vent 14. By providing the third heat dissipation vents 15, it enables multi-directional airflow intake into the battery pack, promotes more uniform heat distribution across the battery cell assembly 2, and prevents local overheating. The convergence of internal airflow ensures comprehensive and efficient airflow distribution across the surface of the battery cell, maintaining overall thermal equilibrium while further enhancing the battery pack's heat dissipation capability. This design not only enhances air circulation and improves internal heat exchange efficiency but also ensures reliable heat dissipation. Even if one heat dissipation vent is partially blocked by external factors, the battery pack can still achieve sufficient heat dissipation through another inlet. Such a multi-inlet/single-outlet airflow configuration facilitates faster surface temperature reduction of the battery cell.

In an embodiment, a total area of the third heat dissipation vent 15 is less than or equal to that of the second heat dissipation vent 14, thereby solving the problem of local overheating caused by a single airflow direction. Sufficient air intake in the lateral direction or in other directions ensures uniform heat dissipation across all parts of the battery cell while preventing performance degradation or safety risks caused by local overheating. The meticulous vent configuration allows better control of temperature gradients across different areas of the device. The multi-inlet/single-outlet configuration ensures that even if one heat dissipation vent malfunctions due to partial blockage or other problems, sufficient airflow and heat dissipation effect can be provided by the remaining heat dissipation vents, thereby guaranteeing continuous operation and reliability of the system.

In an embodiment, a total area of the third heat dissipation vent 15 is greater than that of the second heat dissipation vent 14, thereby solving the problem of local overheating caused by a single airflow direction. Sufficient air intake in the lateral direction or in other directions ensures uniform heat dissipation across all parts of the battery cell while preventing performance degradation or safety risks caused by local overheating. The meticulous vent configuration allows better control of temperature gradients across different areas of the device. The multi-inlet/single-outlet configuration ensures that even if one heat dissipation vent malfunctions due to partial blockage or other problems, sufficient airflow and heat dissipation effect can be provided by the remaining heat dissipation vents, thereby guaranteeing continuous operation and reliability of the system.

In an embodiment, the second heat dissipation vent 14 is arranged at a central area on the side of the housing assembly 1 that is provided with the opening 13 and opposite to the first heat dissipation vent 11, enabling more uniform airflow distribution across the surface of the battery cell assembly 2. The resulting center-to-periphery airflow pattern mitigates local overheating while maintaining temperature uniformity inside the battery pack.

In an embodiment, the second heat dissipation vent 14 is arranged at a central area on the side of the housing assembly 1 that is provided with the opening 13 and opposite to the first heat dissipation vent 11, and is adjacent to the opening 13, enabling more uniform airflow distribution across the surface of the battery cell assembly 2. The resulting center-to-periphery airflow pattern mitigates local overheating while maintaining temperature uniformity inside the battery pack.

In an embodiment, the housing assembly 1 is provided with a locking slot 16 for locking the tool battery pack to prevent it from displacement. The second heat dissipation vent 14 is arranged at a central area on the side of the housing assembly 1 that is provided with the opening 13 and opposite to the first heat dissipation vent 11, and is located between the opening 13 and the locking slot 16, enabling more uniform airflow distribution across the surface of the battery cell assembly 2. The resulting center-to-periphery airflow pattern mitigates local overheating while maintaining temperature uniformity inside the battery pack.

Figure 4:
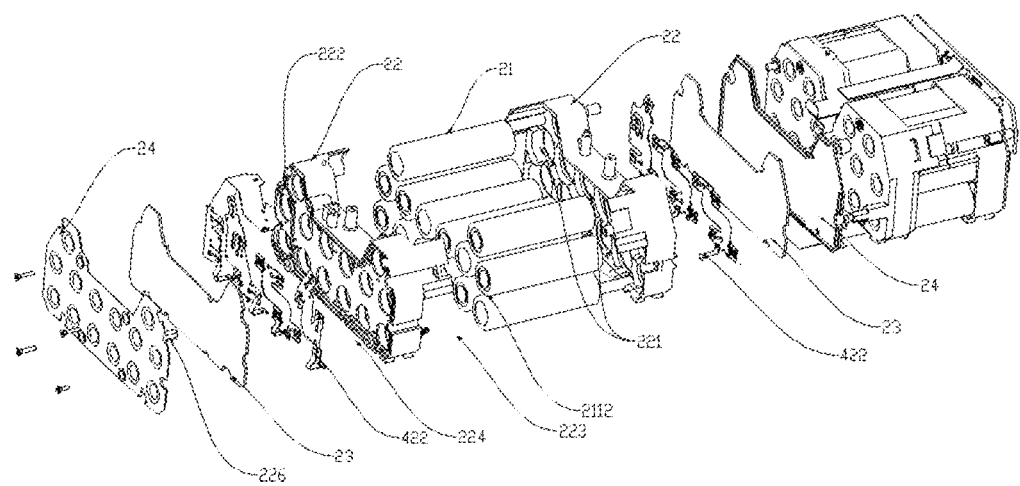
FIG. 4 is an exploded view of an internal structure of a tool battery pack provided in an embodiment of the present application.

In an embodiment, the housing assembly 1 has a 2-part split configuration and is designed as a recessed housing with an opening on the top or any side, where an end cover is connected to the housing via the side where the opening is located; or the housing assembly 1 has a 3-part split configuration and is designed as a through-type integrally molded housing with openings on opposite sides, where an end cover is connected to the housing via the openings; or the housing assembly 1 has a 4-part split configuration and is designed as a through-type split housing with openings on opposite sides, where the housing allows for top-bottom closing and an end cover is connected to the housing via the openings. The assembly form of the housing assembly 1 is not specifically limited herein. In an embodiment, the housing assembly 1 further includes a drainage port 113 positioned on at least one side of the battery pack other than the side where the opening 13 is located, and the drainage port is configured to drain water entering the housing assembly 1. Referring to FIG. 4, the battery cell assembly 2 includes a unit battery cell 21, a battery cell holder 22, a waterproof layer 23, and a waterproof member 24; and the unit battery cell 21 is a cylindrical battery cell having a first battery cell end face 211 and a second battery cell end face 212.

Figure 5:
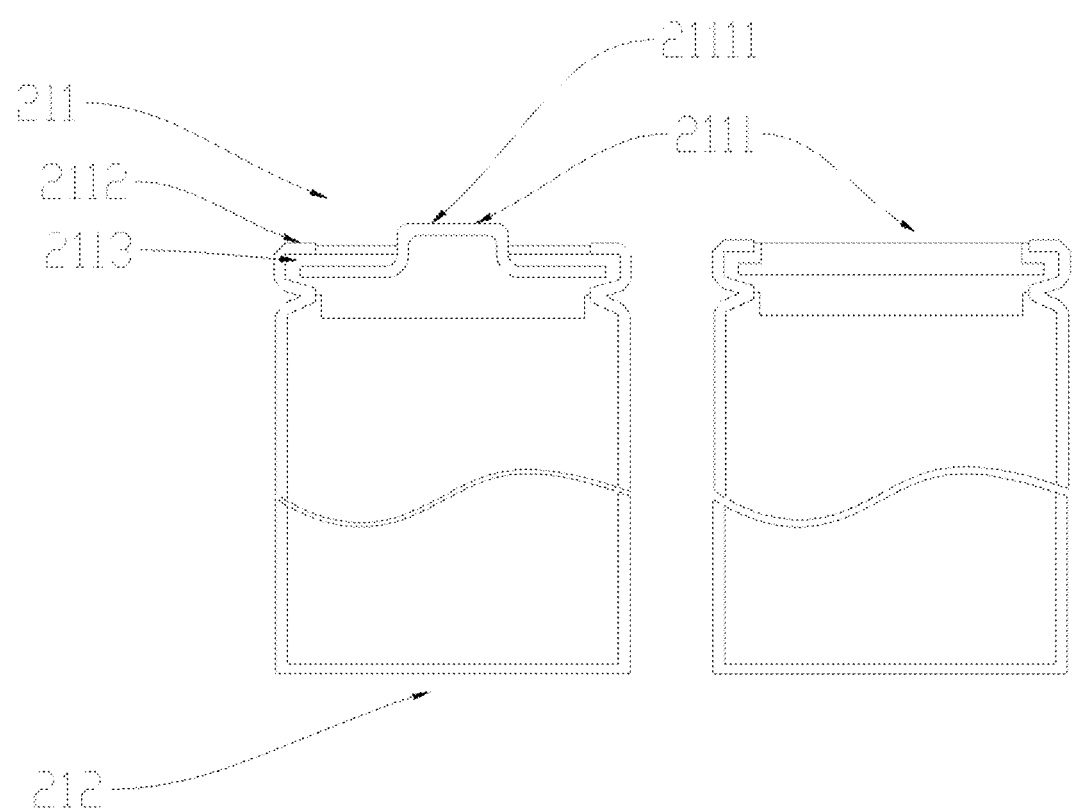
FIG. 5 is a sectional view of a unit battery cell provided in an embodiment of the present application.
Figure 6:
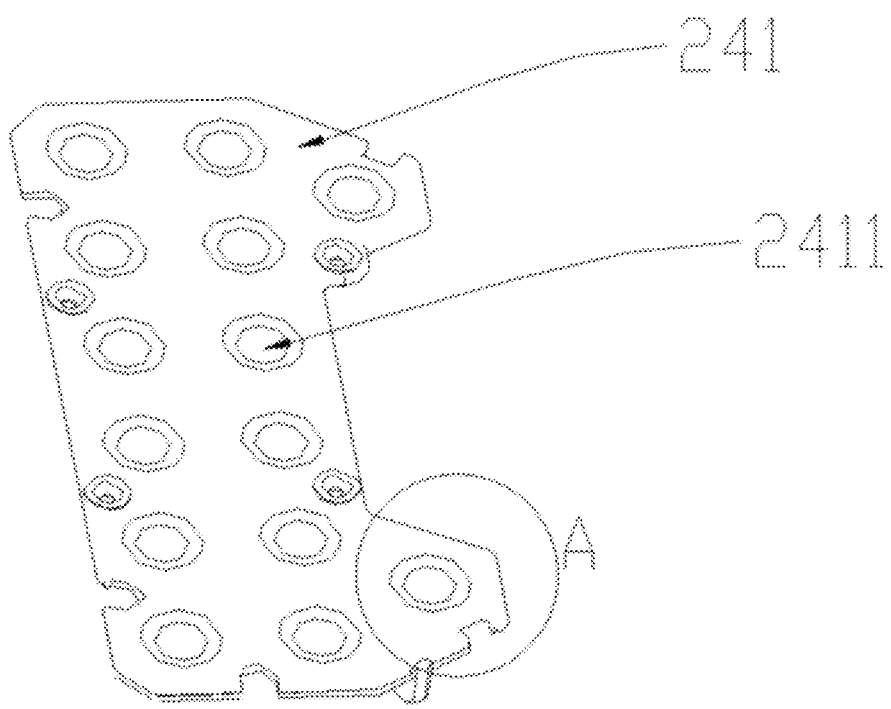
FIG. 6 is a perspective view of a first end face of a waterproof plate of a tool battery pack provided in an embodiment of the present application.
Figure 7:
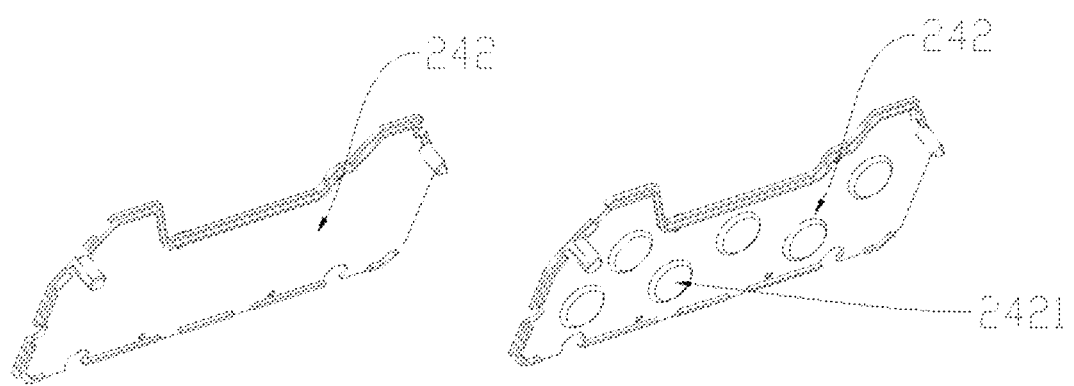
FIG. 7 is a perspective view of a second end face of a waterproof plate of a tool battery pack provided in an embodiment of the present application.
Figure 8:
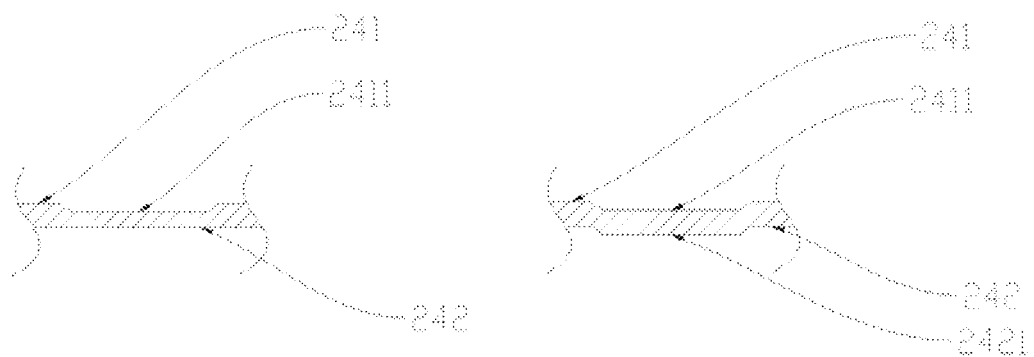
FIG. 8 is a partially enlarged sectional view of an area A of a waterproof plate of a tool battery pack provided in an embodiment of the present application.

Referring to FIG. 5, in an embodiment, the first battery cell end face 211 has a positive end face 2111, and the positive end face 2111 is a flat end face. Referring to FIG. 5, in an embodiment, the first battery cell end face 211 has a positive end face 2111 provided with a cap end face 21111, where the cap end face 21111 protrudes outward from the positive end face 2111.

Figure 9:
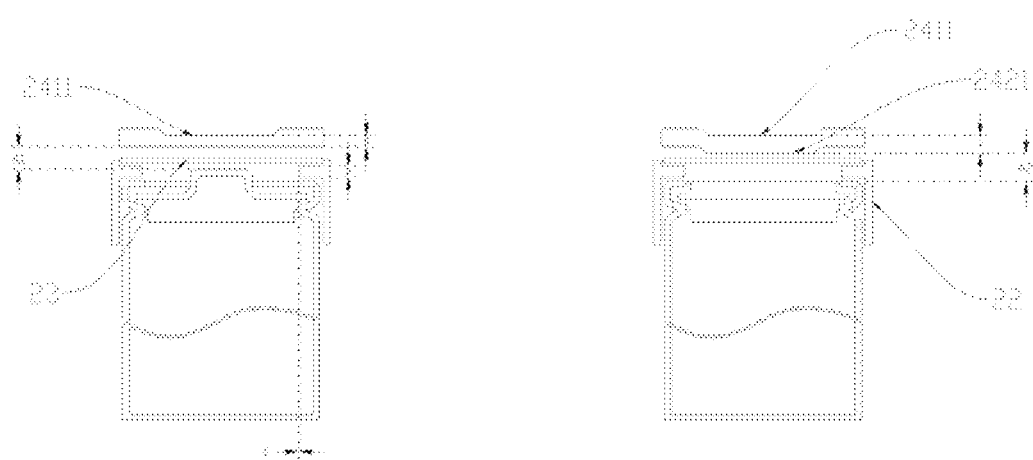
FIG. 9 shows an assembly relationship between a local waterproof plate, a waterproof layer, a battery cell holder, and a unit battery cell provided in an embodiment of the present application.
Figure 10:
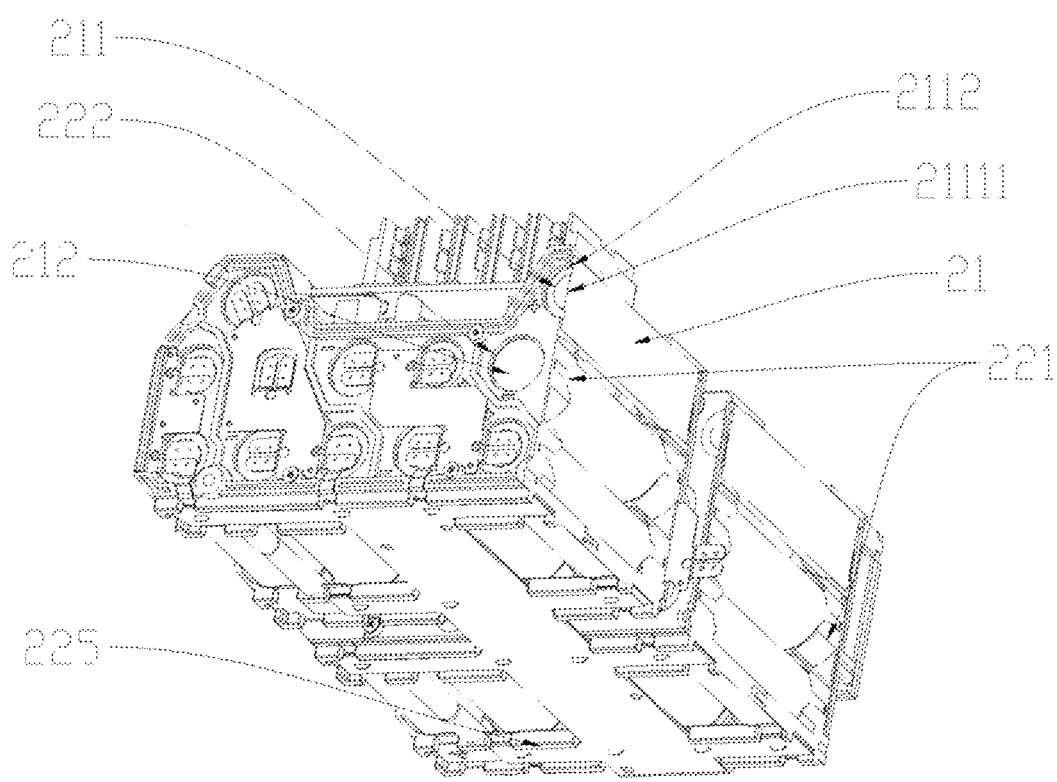
FIG. 10 is a partial sectional view of an internal structure of a tool battery pack provided in an embodiment of the present application, with a waterproof plate and a waterproof layer hidden.

Referring to FIGS. 5 and 9-10, in an embodiment, the first battery cell end face 211 has a positive end face 2111 and a negative end face 2112, where an isolating member 2113 is arranged between the negative end face 2112 and the positive end face 2111 to isolate a positive electrode from a negative electrode, thereby avoiding short circuits; and on the first battery cell end face 211, a first edge, which is an edge of the negative end face 2112 closer to a central axis of the unit battery cell 21, is exposed from the exposed hole 222, and a projection distance C between the first edge and an inner edge of the exposed hole 222 is greater than or equal to 0.1 mm. By setting the distance between the exposed hole 222 and the first edge, it not only structurally enhances electrical isolation but also enables the waterproof layer 23 to cover the negative end face 2112 and the isolating member 2113. Once the isolating member 2113 becomes damaged or fails due to aging, the waterproof layer 23 serves as an additional barrier, preventing moisture ingress into the interior of the battery cell. Furthermore, by covering both the negative end face 2112 and the exposed hole 222, the waterproof layer 23 prevents moisture from penetrating through assembly gaps of an accommodating slot 221 into the battery cell end face along the length of the battery cell, thereby preventing any contact between the moisture and the positive and negative end faces 2111, 2112 to avoid potential short-circuit risks.

Referring to FIG. 4, the battery cell holder 22 is provided with an accommodating slot 221, an exposed hole 222, a first end 223, and a second end 224, where the accommodating slot 221 is arranged at the first end 223 of the battery cell holder 22 to accommodate the unit battery cell 21, a slot for accommodating the unit battery cell 21 is formed at an end of the accommodating slot 221, and the exposed hole 222 extending through the battery cell holder 22 is formed at another end of the accommodating slot 221; an inner area of the exposed hole 222 is less than a cross-sectional area of the accommodating slot 221 parallel to the exposed hole 222; an area of the exposed hole 222 is less than a maximum area of the first battery cell end face 211 extending into the accommodating slot 221; a shape of the exposed hole 222 includes but is not limited to circular, oval, and square shapes; and the battery cell holder 22 is firmly fixed to the holder mounting base 12 in the housing assembly 1 by means of, but not limited to, welding or screw connection to provide additional structural support and anti-vibration protection.

Referring to FIG. 10, in an embodiment, the battery cell holder 22 is provided with a limiting portion 225 configured to fit with the holder mounting base 12, and the limiting portion 225 includes a locking member 2251, which may take various forms, including but not limited to a screw hole tightened with a screw, a first mortise-tenon structure engaged with a second mortise-tenon structure on the housing assembly 1, welding the limiting portion 225 onto the housing assembly 1, or adhesive bonding, thereby preventing the battery cell holder 22 from displacement within the housing assembly 1.

Referring to FIG. 9, in an embodiment, an inner height D of the exposed hole 222 is greater than or equal to 0.5 mm and less than or equal to 2.5 mm. By setting the inner height D of the exposed hole 222 to be greater than or equal to 0.5 mm, it provides effective support strength for the unit battery cell 21, thereby preventing positional displacement of the unit battery cell 21 caused by vibration or other external forces during normal use and enhancing the overall mechanical stability and safety of the battery pack. Additionally, keeping the height less than or equal to 2.5 mm helps reinforce the support strength while avoiding unnecessary material usage, thereby optimizing the weight of the battery pack and further improving energy efficiency and endurance. This height range also ensures efficient utilization of the internal space within the battery cell. While ensuring strong support, the well-designed inner height of the exposed hole avoids unnecessary occupation of the battery pack's effective space, allowing the battery pack to maximize capacity and energy density within a limited space.

The waterproof layer 23 is arranged at the second end 224 of the battery cell holder 22 through either a potting process or a vacuum deposition process, and covers the first and second battery cell end faces 211, 212 of the unit battery cell 21, thereby avoiding short-circuit risks caused by contact between the first and second battery cell end faces 211, 212 and external moisture. Referring to FIGS. 6-10, the waterproof member 24 is arranged at the second end 224 of the battery cell holder 22 and has a first end face 241 away from the battery cell holder 22 and a second end face 242 closer to the battery cell holder 22, and at least part of the waterproof layer is arranged between the second end face 242 and the battery cell holder 22. Conventional waterproofing methods typically involve applying the waterproof material and then allowing it to cure for a period of time before proceeding to subsequent assembly steps. As a result, the overall production efficiency is constrained by the curing time of the waterproof material. In contrast, by employing the waterproof member 24 with a second convex face, the present application achieves dual benefits: on one hand, subsequent assembly steps can proceed immediately after the waterproof layer 23 covers the battery cell holder 22, eliminating the need to wait for the waterproof layer 23 to dry, which significantly enhances production line efficiency, reduces waiting time, and improves production flexibility and responsiveness; on the other hand, the waterproof layer 23 can press against the battery cell end face through the waterproof member 24, which protects the waterproof layer 23 against peeling off from the battery cell end face due to vibration or abrasion, and meanwhile, the waterproof layer 23 on the battery cell end face at the exposed hole 222 is kept thin, enabling an abnormal unit battery cell 21 to rapidly break the thin area, thereby providing a safe pressure relief mechanism, preventing impact on adjacent unit battery cells or battery cell assemblies 2, and avoiding cascading thermal runaway events.

Referring to FIG. 9, in an embodiment, the first end face 241 has a first convex face 2411 protruding toward the end face of the unit battery cell 21 at the exposed hole 222, the second end face 242 is flat, and the waterproof member 24 has the first convex face 2411 at the exposed hole 222. By configuring the waterproof member 24 to be thin at the exposed hole 222, during abnormal overheating conditions, the battery cell typically exhibits high-pressure and high-temperature jet fires at the first end face 211. In such cases, an abnormal unit battery cell 21 can rapidly break the thin area of the waterproof layer, thereby providing a safe pressure relief mechanism that prevents impact on adjacent unit battery cells 21 or battery cell assemblies 2 and avoids cascading thermal runaway events.

Referring to FIG. 9, in an embodiment, the first end face 241 has a first convex face 2411 protruding toward the end face of the unit battery cell 21 at the exposed hole 222, the second end face 242 is flat, and a distance B between the first convex face 2411 and the second end face 242 is greater than 0.3 mm and less than or equal to 3 mm. By setting a range of the distance B between the first convex face 2411 and the second end face 242, the thickness of the thin area can be optimally controlled for more reliable breakage while effectively preventing piercing of the waterproof layer due to improper operations during a compression process. This design ensures waterproof protection while providing a well-defined and controlled pressure relief channel for abnormal conditions such as high pressure and high temperature. Furthermore, by defining the range of the distance B, the thickness of the thin area can remain controllable and consistent during manufacturing, which not only ensures quality control in mass production but also enhances process stability.

In an embodiment, the second end face 242 is non-flat and has a second convex face 2421 protruding toward the end face of the unit battery cell 21 at the exposed hole 222, a distance A2 between the second convex face 2421 and the positive end face 2111 is greater than or equal to 0.1 mm, or a distance A1 between the second convex face 2421 and the cap end face 21111 is greater than or equal to 0.1 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the second end face 242 is non-flat and has a second convex face 2421 protruding toward the end face of the unit battery cell 21 at the exposed hole 222, a distance A2 between the second convex face 2421 and the positive end face 2111 is greater than or equal to 0.1 mm and less than 2 mm, or a distance A1 between the second convex face 2421 and the cap end face 21111 is greater than or equal to 0.1 mm and less than 2 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the second end face 242 has a second convex face 2421 protruding toward the end face of the unit battery cell 21 at the exposed hole 222, a distance A2 between the second convex face 2421 and the positive end face 2111 is greater than or equal to 0.5 mm and less than 1 mm, or a distance A1 between the second convex face 2421 and the cap end face 21111 is greater than or equal to 0.5 mm and less than 1.5 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the second end face 242 has a second convex face 2421 protruding toward the end face of the unit battery cell 21 at the exposed hole 222, a distance A2 between the second convex face 2421 and the positive end face 2111 is greater than or equal to 0.3 mm and less than or equal to 0.8 mm, or a distance A1 between the second convex face 2421 and the cap end face 21111 is greater than or equal to 0.3 mm and less than or equal to 1.2 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

Figure 17:
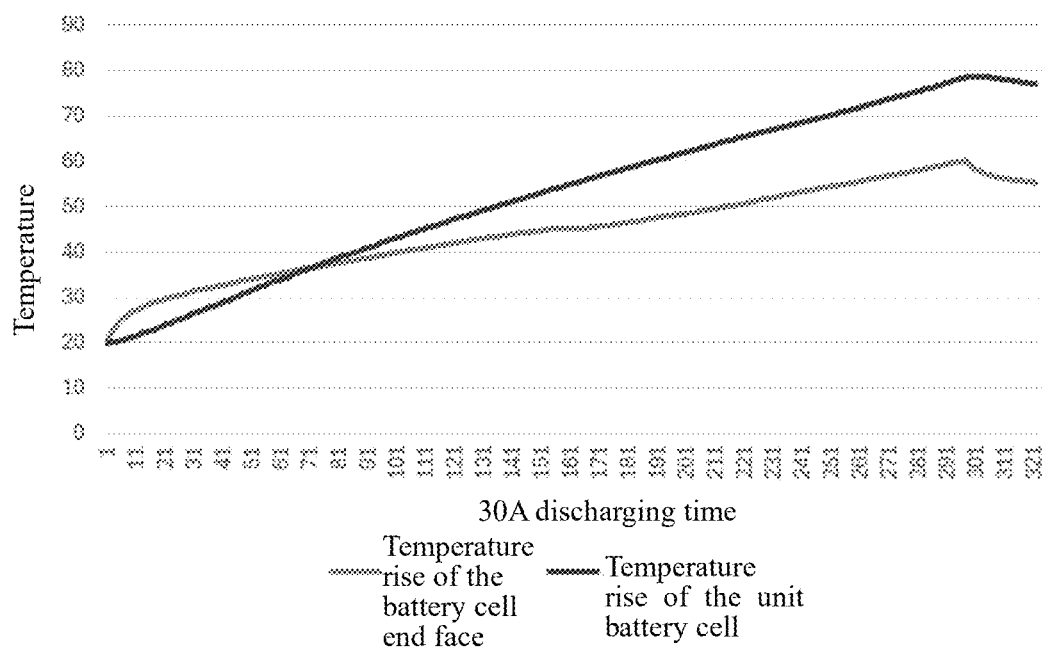
FIG. 17 is a temperature variation data graph of a 60V battery cell and a battery cell end face under a 30 A discharging mode provided in an embodiment of the present application.
Figure 18:
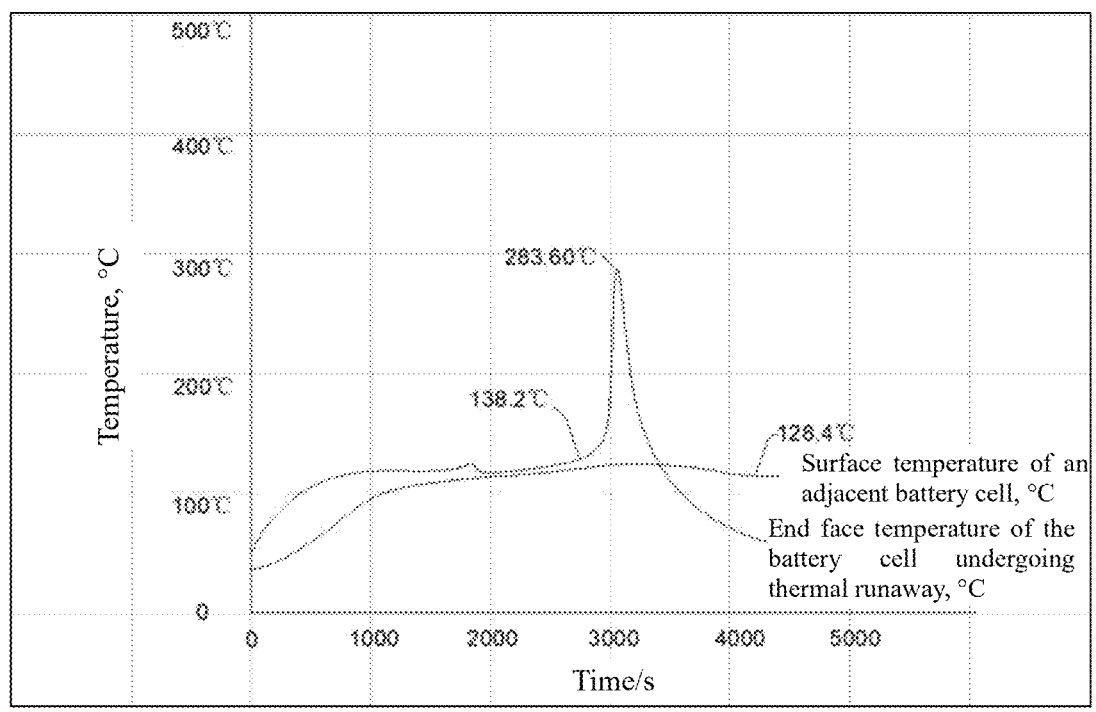
FIG. 18 is a temperature variation data graph of a unit battery cell undergoing thermal runaway and an adjacent battery cell of a tool battery pack provided in an embodiment of the present application.

Referring to FIG. 17, in an embodiment, the waterproof member 24 is made of a non-metal material with a thermal softening temperature higher than or equal to 90° C. As shown in FIG. 17, during 30 A discharging of a 60V unit battery cell 21, the temperature rise of the battery cell end face reaches about 60° C. As current intensity increases, the temperature rise of the battery cell end face also escalates. In order to protect the unit battery cell 21, when the battery cell is overheated during charging/discharging, a high-pressure and high-temperature jet fire is usually generated at the first battery cell end face 211, at which time the temperature of the battery cell end face generally exceeds 100° C. By configuring the waterproof member 24 to be made of a non-metal material with a thermal softening temperature higher than or equal to 90° C., it can autonomously soften during an abnormal temperature rise of the unit battery cell 21, enabling the abnormal unit battery cell 21 to rapidly break the thin area of the waterproof layer, thereby providing a safe pressure relief mechanism that prevents impact on adjacent unit battery cells 21 or battery cell assemblies 2 and avoids cascading thermal runaway events; meanwhile, during a normal temperature rise of the unit battery cell 21, it provides stable and effective waterproof performance unaffected by the temperature rise.

In an embodiment, the waterproof member 24 is made of any one of acrylonitrile butadiene styrene (ABS), polycarbonate (PC), polypropylene (PP), polyethylene (PE), polyamide (PA), or glass fiber (GF). By configuring the waterproof member 24 to be made of any one of ABS, PC, PP, PE, PA, or GF, it can autonomously soften during an abnormal temperature rise of a unit battery cell 21, enabling the abnormal unit battery cell 21 to rapidly break the thin area of the waterproof layer, thereby providing a safe pressure relief mechanism that prevents impact on adjacent unit battery cells 21 or battery cell assemblies 2 and avoids cascading thermal runaway events; meanwhile, during a normal temperature rise of the unit battery cell 21, it provides stable and effective waterproof performance unaffected by the temperature rise.

In an embodiment, the waterproof member 24 is a waterproof plate with the same thickness, which is greater than or equal to 0.3 mm and less than or equal to 3 mm, and the waterproof member 24 has a first convex face 2411 and a second convex face 2421 protruding toward the end face of the unit battery cell 21 at the exposed hole 222. By configuring the first convex face 2411 and the second convex face 2421 to be thin at the exposed hole 222, during abnormal overheating conditions, the battery cell typically exhibits high-pressure and high-temperature jet fires at the first end face 211. In such cases, an abnormal unit battery cell 21 can rapidly break the thin area of the waterproof plate, thereby providing a safe pressure relief mechanism that prevents impact on adjacent unit battery cells 21 or battery cell assemblies 2 and avoids cascading thermal runaway events.

In an embodiment, the waterproof member 24 is a waterproof plate with uneven thickness, and the thickness of a part of the waterproof member 24 at the exposed hole 222 is less than or equal to that of a part of the waterproof member 24 outside the exposed hole 222. By configuring the waterproof member 24 to be thin at the exposed hole 222, during abnormal overheating conditions, the battery cell typically exhibits high-pressure and high-temperature jet fires at the first battery cell end face 211. In such cases, an abnormal unit battery cell 21 can rapidly break the thin area of the waterproof layer, thereby providing a safe pressure relief mechanism that prevents impact on adjacent unit battery cells 21 or battery cell assemblies 2 and avoids cascading thermal runaway events.

Referring to FIG. 4, in an embodiment, the waterproof member 24 has a positioning member 226, and the positioning member 226 is a positioning hole configured to fit with a positioning post arranged on the battery cell holder 22, where the positioning post has a size ranging from 1 mm to 10 mm, thereby enabling effective positioning.

In an embodiment, the waterproof member 24 has a positioning member 226, and the positioning member 226 is a positioning post with a size ranging from 0.5 mm to 2 mm and configured to fit with a positioning hole formed in the battery cell holder 22, where part or all of the positioning post is accommodated in the positioning hole; and in an embodiment, the waterproof member 24 is connected to the battery cell holder 22 through, but not limited to, a mortise-and-tenon engagement structure, welding, adhesive bonding, or similar methods, ensuring a secured fit.

Figure 11:
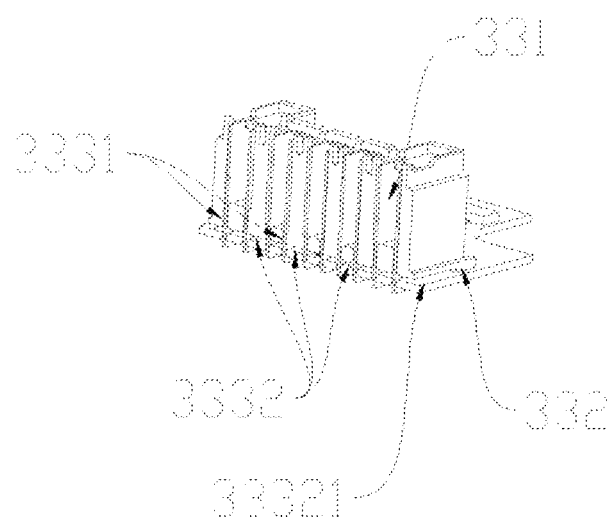
FIG. 11 is a partial perspective view of an electrode holder provided in an embodiment of the present application.
Figure 12:
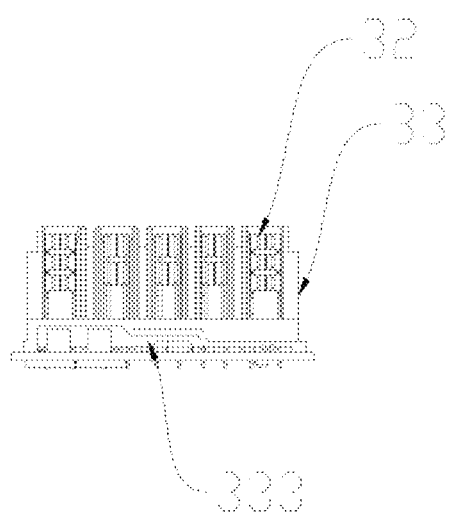
FIG. 12 is a front view of an electrode holder provided in an embodiment of the present application.
Figure 13:
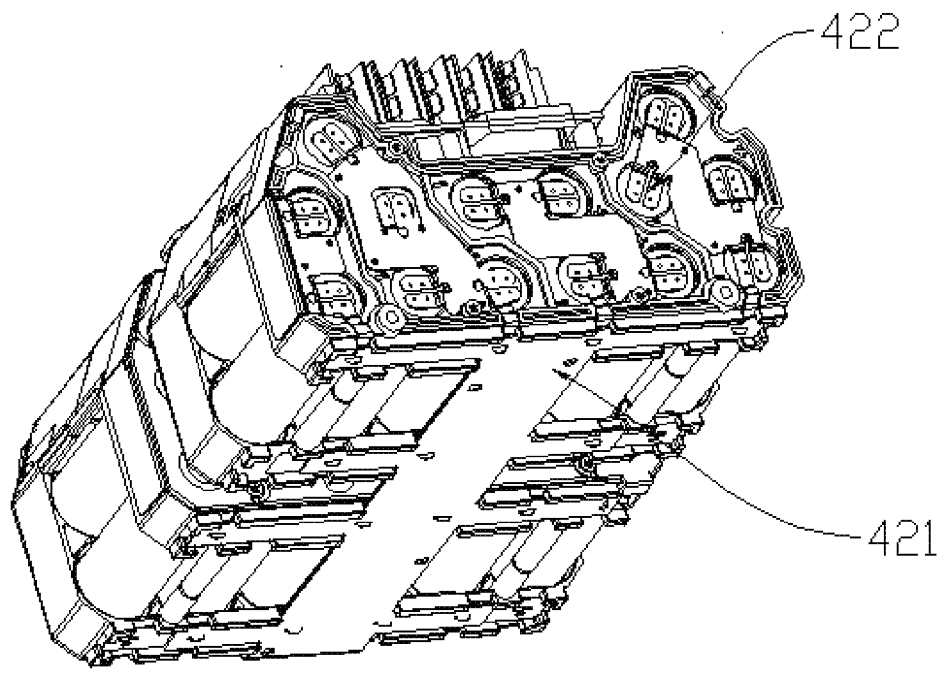
FIG. 13 is a schematic diagram of an internal structure of a tool battery pack provided in an embodiment of the present application.

Referring to FIGS. 10-12, the electrode holder 3 is provided with a terminal assembly 32 and a terminal mounting base 33 that includes a guide slot 331, a fixed end 332, and a waterproof space 333, where the guide slot 331 is configured to direct correct insertion of an electrode, preventing installation errors that could lead to short circuits, while also securing the electrode to ensure effective connection with the control device 4; the fixed end 332 is configured to be fixedly connected to the control device 4; and the waterproof space 333 includes a first waterproof space 3331 and a second waterproof space 3332, where the first waterproof space 3331 is an assembly gap between the terminal mounting base 33 and the terminal assembly 32 when the terminal mounting base 33 positions the terminal assembly 32, the second waterproof space 3332 is an assembly gap between the terminal mounting base 33 and the control device 4 and has at least one entry port 33321 located between the terminal mounting base 33 and the control device 4, and the entry port 33321 is designed to facilitate the rapid and uniform penetration of the waterproof material during operation to fill the second waterproof space 3332, thereby enabling efficient waterproofing during installation and maintenance and safeguarding long-term secure operation of the control device. The fully filled second waterproof space 3332 provides a fundamental waterproof barrier for the terminal assembly 32, protecting internal structures from moisture and contaminants that could otherwise lead to control board malfunctions.

In an embodiment, the fixed end 332 is a columnar structure with a height that is greater than or equal to 0.5 mm and less than or equal to 3 mm, and the fixed end 332 has a first end connected to the terminal mounting base 33 and a second end connected to the control device 4, supporting the terminal mounting base 33 to prevent it from contact with the control device 4; and the second waterproof space 3332 is a projected area of the terminal mounting base 33 on the control device 4, forming a non-contact space between the terminal mounting base 33 and the control device 4. In an embodiment, the terminal mounting base 33 is provided with a protruding fixed end 332 on the side adjacent to the control device 4, where the fixed end 332 is connected to the control device 4, supporting the terminal mounting base 33 to prevent it from contact with the control device 4; and the second waterproof space 3332 is a projected area of the terminal mounting base 33 on the control device 4, forming a non-contact space between the terminal mounting base 33 and the control device 4.

In an embodiment, the waterproof material in both the first waterproof space 3331 and the second waterproof space 3332 is encapsulated in a single molding process via vacuum deposition, where a height of the entry port 33321 is greater than or equal to 0.5 mm, and/or a minimum height of the second waterproof space 3332 is greater than or equal to 0.5 mm. The height being greater than or equal to 0.5 mm ensures that, during both the vacuum deposition process and the overall battery pack compression, the waterproof material can fully and uniformly fill the second waterproof space 3332, thereby preventing insufficient filling in central areas of the second waterproof space 3332 and avoiding uneven distribution of the waterproof material within the second waterproof space 3332.

In an embodiment, the waterproof material in both the first waterproof space 3331 and the second waterproof space 3332 is encapsulated in a single molding process via low-pressure injection molding, where a height of the entry port 33321 is greater than or equal to 0.8 mm, and/or a minimum height of the second waterproof space 3332 is greater than or equal to 0.8 mm. The height being greater than or equal to 0.8 mm ensures that, during both the low-pressure injection molding process and the overall battery pack compression, the waterproof material can fully and uniformly fill the second waterproof space 3332, thereby preventing insufficient filling in central areas of the second waterproof space 3332 and avoiding uneven distribution of the waterproof material within the second waterproof space 3332.

In an embodiment, the waterproof material in both the first waterproof space 3331 and the second waterproof space 3332 is encapsulated via potting, where a height of the entry port 33321 is greater than or equal to 0.5 mm, and/or a minimum height of the second waterproof space 3332 is greater than or equal to 0.5 mm. The height being greater than or equal to 0.5 mm ensures that, during both the potting process and the overall battery pack compression, the waterproof material can fully and uniformly fill the second waterproof space 3332, thereby preventing insufficient filling in central areas of the second waterproof space 3332 and avoiding uneven distribution of the waterproof material within the second waterproof space 3332.

The control device 4 is arranged on the battery cell holder 22 and includes a control board 41 and a connecting member 42, where the control board 41 at least includes a control module and a communication module, and is connected to the unit battery cell 21 via the connecting member 42 through the exposed hole 222 to enable communication and control functions; the control module is configured to regulate parameters such as voltage, current, and temperature within the battery pack to ensure safe and efficient system operation; and the communication module is configured to conduct data exchange with external devices to achieve monitoring of the battery pack's operating status.

Figure 14:
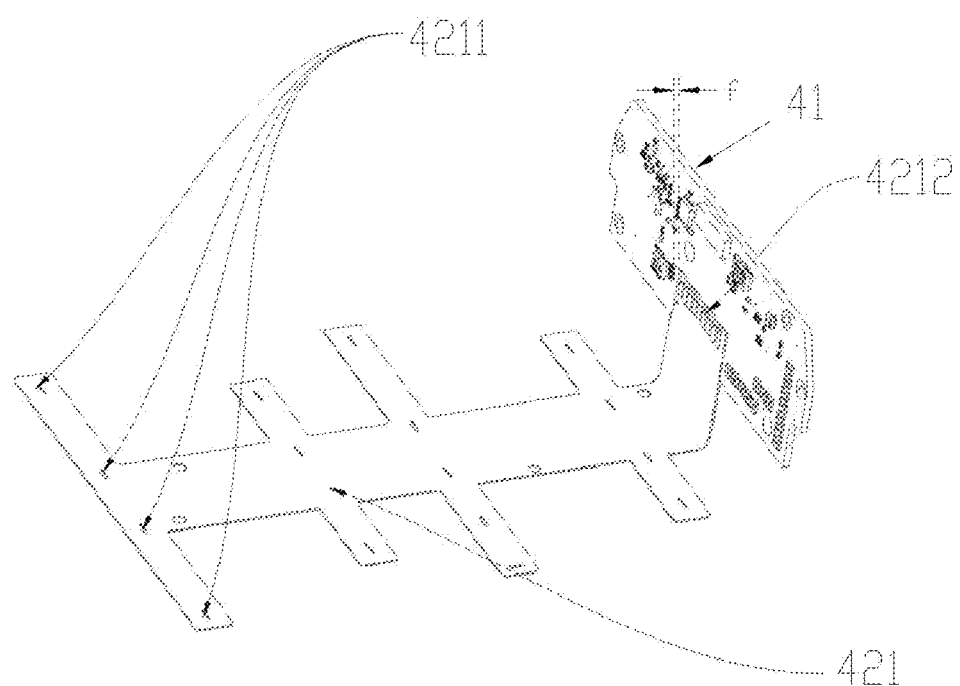
FIG. 14 is a perspective view of a connecting member provided in an embodiment of the present application.
Figure 15:
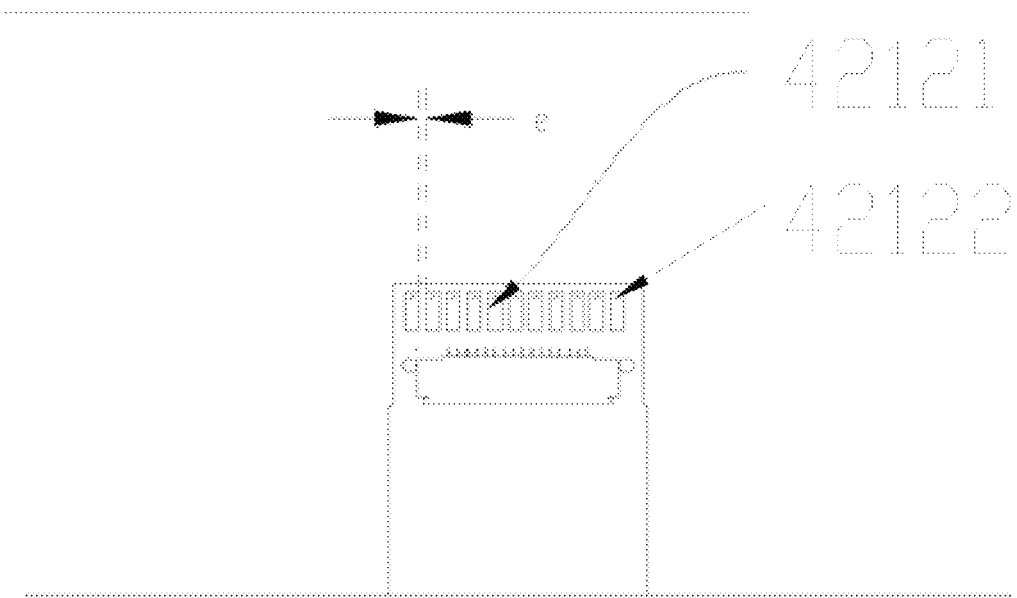
FIG. 15 is a front view of a first welding base provided in an embodiment of the present application.
Figure 16:
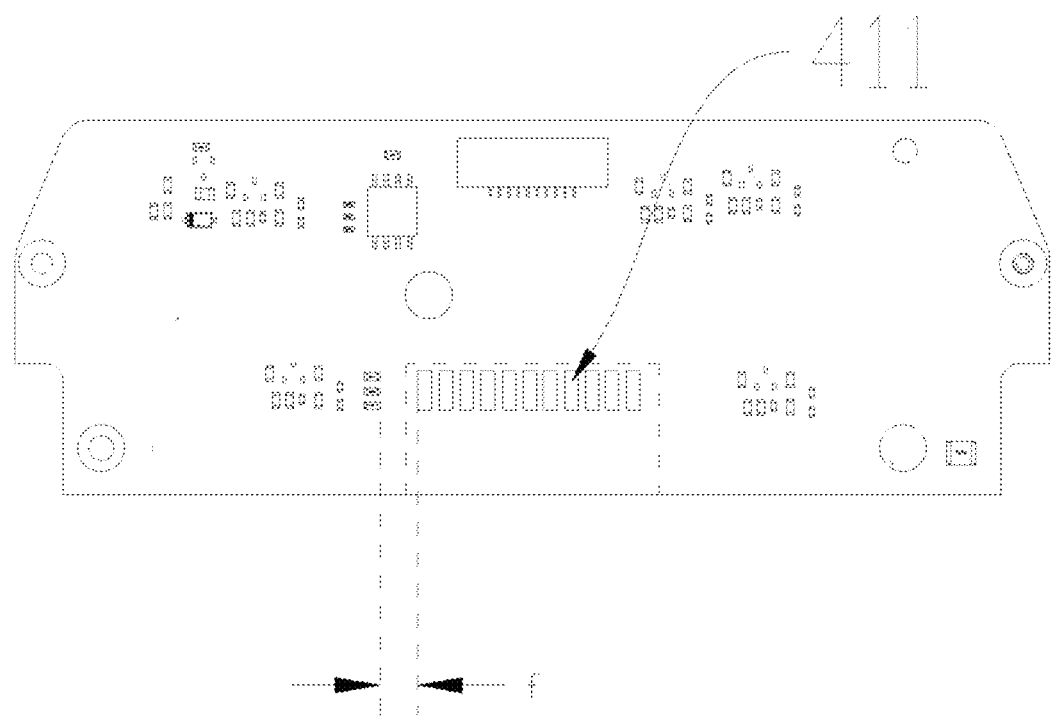
FIG. 16 is a front view of a second welding base provided in an embodiment of the present application.

Referring to FIGS. 14-16, the connecting member 42 includes a unit battery cell detector 421 and multiple connecting tabs 422, where the unit battery cell detector 421 has a first connecting end 4211 and a second connecting end 4212; the first connecting end 4211 is connected to the connecting tabs 422; each of the connecting tabs 422 is connected to the unit battery cell 21 through the exposed hole 222; and the second connecting end 4212 is connected to the control board 41 through a welding process, thereby preventing poor waterproof performance of terminals in the case of messy power wiring to the control board through the terminals and facilitating easier maintenance of the battery pack.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121 arranged at the second connecting end, where an area of each of the first bonding pads 42121 is less than or equal to that of each of the second bonding pads 411, which ensures the smaller first bonding pad 42121 can be completely attached to the larger second bonding pad 411, effectively reducing potential short-circuit risks between adjacent bonding pads, thereby enhancing circuit safety and reliability, and providing good thermal conduction and electrical connection; meanwhile, the thermal expansion effect of the smaller bonding pad on the larger one helps mitigate mechanical stress caused by thermal expansion and contraction, consequently reducing solder joint fatigue and potential weld cracks, while increasing mechanical strength of the welds and improving connection stability and durability.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where each of the first bonding pads 42121 is provided with at least one through-hole 42122 extending through the first bonding pad 42121, with a ratio of a diameter of the through-hole 42122 to a width of the first bonding pad 42121 being less than or equal to 1:2, which enhances solder permeability during the welding process and improves both mechanical strength and robustness of electrical connections; and the through-hole enables superior solder filling, resulting in more robust connections with better electrical conductivity.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where a minimum distance e between each two adjacent ones of the first bonding pads 42121 and/or between each two adjacent ones of the second bonding pads 411 is greater than or equal to 0.2 mm and less than or equal to 2 mm, which effectively reduces short-circuit risks caused by solder bridging or conductive particle contamination while reducing welding defects from manufacturing variations; and the increased distance provides greater tolerance for welding and subsequent operations during manufacturing and handling, enhances overall circuit safety and reliability, prevents signal crosstalk, and improves signal integrity and transmission efficiency, thereby enabling effective heat dissipation for each bonding pad to avoid local overheating due to excessive heat concentration, while facilitating superior thermal diffusion and management.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where a distance f between a surrounding component and a first bonding pad, adjacent to the surrounding component, of the first bonding pads 42121 and/or between a surrounding component and a second bonding pad, adjacent to the surrounding component, of the second bonding pads 411 is greater than or equal to 1 mm and less than or equal to 25 mm. The increased distance being greater than or equal to 1 mm and less than or equal to 25 mm between the bonding pad and the surrounding component helps mitigate electromagnetic interference effects, and this physical isolation can reduce signal coupling on the circuit board, enhance signal integrity, and ensure more stable electrical performance; meanwhile, the greater distance between the surrounding component and the bonding pad reduces short-circuit risks from accidental contact or material bridging (such as solder overflow), providing additional safety margin during production and subsequent equipment operations. Furthermore, the increased distance improves the circuit board's heat dissipation capability, allowing more efficient thermal conduction from high-temperature areas and preventing local overheating and heat accumulation issues.

In an embodiment, a tin-plating thickness on the first bonding pads 42121 and/or the second bonding pads 411 ranges from 0.05 mm to 0.15 mm. By controlling the tin-plating thickness to 0.05 mm to 0.15 mm, it can reduce excessive solder flow during the welding process, thereby reducing solder bridging and short circuit risks while simultaneously enhancing electrical isolation in the soldered areas.

Embodiments of the present application will be described below in detail with reference to the accompanying drawings.

A tool battery pack includes a housing assembly 1, a battery cell assembly 2, an electrode holder 3, and a control device 4, where the housing assembly 1 includes a holder mounting base (not shown) and an opening 13, and is configured to accommodate the battery cell assembly, the electrode holder, and the control device; the opening 13 is arranged on the housing assembly 1 corresponding to the electrode holder 3 to allow an electrode to pass through and connect with the electrode holder 3; and the holder mounting base (not shown) is arranged on at least one interior side of the housing assembly 1 to secure the battery cell assembly 2. Referring to FIG. 4, the battery cell assembly 2 includes a unit battery cell 21, a battery cell holder 22, a waterproof layer 23, and a waterproof member 24; and the unit battery cell 21 is a cylindrical battery cell having a first battery cell end face 211 and a second battery cell end face 212.

Referring to FIG. 5, in an embodiment, the first battery cell end face 211 has a positive end face 2111, and the positive end face 2111 is a flat end face.

Referring to FIG. 5, in an embodiment, the first battery cell end face 211 has a positive end face 2111 provided with a cap end face 21111, where the cap end face 21111 protrudes outward from the positive end face 2111.

Referring to FIGS. 5 and 9, in an embodiment, the first battery cell end face 211 has a positive end face 2111 and a negative end face 2112, where an isolating member 2113 is arranged between the negative end face 2112 and the positive end face 2111 to isolate a positive electrode from a negative electrode, thereby avoiding short circuits; and on the first battery cell end face 211, a first edge, which is an edge of the negative end face 2112 closer to a central axis of the unit battery cell 21, is exposed from the exposed hole 222, and a projection distance C between the first edge and an inner edge of the exposed hole 222 is greater than or equal to 0.1 mm. By setting the distance between the exposed hole 222 and the first edge, it not only structurally enhances electrical isolation but also enables the waterproof layer 23 to cover the negative end face 2112 and the isolating member 2113. Once the isolating member 2113 becomes damaged or fails due to aging, the waterproof layer 23 serves as an additional barrier, preventing moisture ingress into the interior of the battery cell. Furthermore, by covering both the negative end face 2112 and the exposed hole 222, the waterproof layer 23 prevents moisture from penetrating through assembly gaps of the accommodating slot 221 into the battery cell end face along the length of the battery cell, thereby preventing any contact between the moisture and the positive and negative end faces 2111, 2112 to avoid potential short-circuit risks.

Referring to FIG. 4, the battery cell holder 22 is provided with an accommodating slot 221, an exposed hole 222, a first end 223, and a second end 224, where the accommodating slot 221 is arranged at the first end 223 of the battery cell holder 22 to accommodate the unit battery cell 21, a slot for accommodating the unit battery cell 21 is formed at an end of the accommodating slot 221, and the exposed hole 222 extending through the battery cell holder 22 is formed at another end of the accommodating slot; an inner area of the exposed hole 222 is less than a cross-sectional area of the accommodating slot 221 parallel to the exposed hole 222; an area of the exposed hole 222 is less than a maximum area of the first battery cell end face 211 extending into the accommodating slot 221; a shape of the exposed hole 222 includes but is not limited to circular, oval, and square shapes; and the battery cell holder 22 is firmly fixed to the holder mounting base 12 in the housing assembly 1 by means of, but not limited to, welding or screw connection to provide additional structural support and anti-vibration protection.

Referring to FIG. 10, in an embodiment, the battery cell holder 22 is provided with a limiting portion 225 configured to fit with the holder mounting base 12, and the limiting portion 225 includes a locking member (not shown), which may take various forms, including but not limited to a screw hole tightened with a screw, a first mortise-tenon structure engaged with a second mortise-tenon structure on the housing assembly 1, welding the limiting portion 225 onto the housing assembly 1, or adhesive bonding, thereby preventing the battery cell holder 22 from displacement within the housing assembly 1.

Referring to FIG. 9, in an embodiment, an inner height D of the exposed hole 222 is greater than or equal to 0.5 mm and less than or equal to 2.5 mm. By setting the inner height D of the exposed hole 222 to be greater than or equal to 0.5 mm, it provides effective support strength for the unit battery cell 21, thereby preventing positional displacement of the unit battery cell 21 caused by vibration or other external forces during normal use and enhancing the overall mechanical stability and safety of the battery pack. Additionally, keeping the height less than or equal to 2.5 mm helps reinforce the support strength while avoiding unnecessary material usage, thereby optimizing the weight of the battery pack and further improving energy efficiency and endurance. This height range also ensures efficient utilization of the internal space within the battery cell. While ensuring strong support, the well-designed inner height of the exposed hole avoids unnecessary occupation of the battery pack's effective space, allowing the battery pack to maximize capacity and energy density within a limited space. The waterproof layer 23 is arranged at the second end 224 of the battery cell holder 22 through either a potting process or a vacuum deposition process, and covers the first and second battery cell end faces 211, 212 of the unit battery cell 21, thereby avoiding short-circuit risks caused by contact between the first and second battery cell end faces 211, 212 and external moisture.

Referring to FIGS. 6-10, the waterproof member 24 is arranged at the second end 224 of the battery cell holder 22 and has a first end face 241 away from the battery cell holder 22 and a second end face 242 closer to the battery cell holder 22, and at least part of the waterproof layer is arranged between the second end face 242 and the battery cell holder 22. By providing the waterproof member 24, subsequent assembly steps can proceed immediately after the waterproof layer 23 covers the battery cell holder 22, eliminating the need to wait for the waterproof layer to dry, which significantly enhances production line efficiency, reduces waiting time, and improves production flexibility and responsiveness.

Referring to FIG. 9, in an embodiment, the first end face 241 has a first convex face 2411 protruding toward the end face of the unit battery cell 21 at the exposed hole 222, the second end face 242 is flat, and the waterproof member 24 has the first convex face 2411 at the exposed hole 222. By configuring the waterproof member 24 to be thin at the exposed hole 222, during abnormal overheating conditions, the battery cell typically exhibits high-pressure and high-temperature jet fires at the first end face 211. In such cases, an abnormal unit battery cell 21 can rapidly break the thin area of the waterproof layer, thereby providing a safe pressure relief mechanism that prevents impact on adjacent unit battery cells 21 or battery cell assemblies 2 and avoids cascading thermal runaway events.

Referring to FIG. 9, in an embodiment, the first end face 241 has a first convex face 2411 protruding toward the end face of the unit battery cell 21 at the exposed hole 222, the second end face 242 is flat, and a distance B between the first convex face 2411 and the second end face 242 is greater than 0.3 mm and less than or equal to 3 mm. By setting a range of the distance B between the first convex face 2411 and the second end face 242, the thickness of the thin area can be optimally controlled for more reliable breakage while effectively preventing piercing of the waterproof layer due to improper operations during a compression process. This design ensures waterproof protection while providing a well-defined and controlled pressure relief channel for abnormal conditions such as high pressure and high temperature. Furthermore, by defining the range of the distance B, the thickness of the thin area can remain controllable and consistent during manufacturing, which not only ensures quality control in mass production but also enhances process stability.

In an embodiment, the second end face 242 is non-flat and has a second convex face 2421 protruding toward the end face of the unit battery cell 21 at the exposed hole 222, a distance A2 between the second convex face 2421 and the positive end face 2111 is greater than or equal to 0.1 mm, or a distance A1 between the second convex face 2421 and the cap end face 21111 is greater than or equal to 0.1 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the second end face 242 is non-flat and has a second convex face 2421 protruding toward the end face of the unit battery cell 21 at the exposed hole 222, a distance A2 between the second convex face 2421 and the positive end face 2111 is greater than or equal to 0.1 mm and less than 2 mm, or a distance A1 between the second convex face 2421 and the cap end face 21111 is greater than or equal to 0.1 mm and less than 2 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the second end face 242 has a second convex face 2421 protruding toward the end face of the unit battery cell 21 at the exposed hole 222, a distance A2 between the second convex face 2421 and the positive end face 2111 is greater than or equal to 0.5 mm and less than 1 mm, or a distance A1 between the second convex face 2421 and the cap end face 21111 is greater than or equal to 0.5 mm and less than 1.5 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the second end face 242 has a second convex face 2421 protruding toward the end face of the unit battery cell 21 at the exposed hole 222, a distance A2 between the second convex face 2421 and the positive end face 2111 is greater than or equal to 0.3 mm and less than or equal to 0.8 mm, or a distance A1 between the second convex face 2421 and the cap end face 21111 is greater than or equal to 0.3 mm and less than or equal to 1.2 mm. By defining ranges of the distances A1 and A2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances A1 and A2, the thickness of the thin area can remain controllable and consistent during manufacturing, which not only ensures quality control in mass production but also enhances process stability.

In an embodiment, the waterproof member 24 is made of a non-metal material with a thermal softening temperature higher than or equal to 90° C. As shown in FIG. 17, during 30 A discharging of a 60V unit battery cell 21, the temperature rise of the battery cell end face reaches about 60° C. As current intensity increases, the temperature rise of the battery cell end face also escalates. In order to protect the unit battery cell 21, when the battery cell is overheated during charging/discharging, a high-pressure and high-temperature jet fire is usually generated at the first battery cell end face 211, at which time the temperature of the battery cell end face generally exceeds 100° C. By configuring the waterproof member 24 to be made of a non-metal material with a thermal softening temperature higher than or equal to 90° C., it can autonomously soften during an abnormal temperature rise of the unit battery cell 21, enabling the abnormal unit battery cell 21 to rapidly break the thin area of the waterproof layer, thereby providing a safe pressure relief mechanism that prevents impact on adjacent unit battery cells 21 or battery cell assemblies 2 and avoids cascading thermal runaway events; meanwhile, during a normal temperature rise of the unit battery cell 21, it provides stable and effective waterproof performance unaffected by the temperature rise.

In an embodiment, the waterproof member 24 is made of any one of acrylonitrile butadiene styrene (ABS), polycarbonate (PC), polypropylene (PP), polyethylene (PE), polyamide (PA), or glass fiber (GF). By configuring the waterproof member 24 to be made of any one of ABS, PC, PP, PE, PA, or GF, it can autonomously soften during an abnormal temperature rise of a unit battery cell 21, enabling the abnormal unit battery cell 21 to rapidly break the thin area of the waterproof layer, thereby providing a safe pressure relief mechanism that prevents impact on adjacent unit battery cells 21 or battery cell assemblies 2 and avoids cascading thermal runaway events; meanwhile, during a normal temperature rise of the unit battery cell 21, it provides stable and effective waterproof performance unaffected by the temperature rise.

In an embodiment, the waterproof member 24 is a waterproof plate with the same thickness, which is greater than or equal to 0.3 mm and less than or equal to 3 mm, and the waterproof member 24 has a first convex face 2411 and a second convex face 2421 protruding toward the end face of the unit battery cell 21 at the exposed hole 222. By configuring the first convex face 2411 and the second convex face 2421 to be thin at the exposed hole 222, during abnormal overheating conditions, the battery cell typically exhibits high-pressure and high-temperature jet fires at the first end face 211. In such cases, an abnormal unit battery cell 21 can rapidly break the thin area of the waterproof plate, thereby providing a safe pressure relief mechanism that prevents impact on adjacent unit battery cells 21 or battery cell assemblies 2 and avoids cascading thermal runaway events.

In an embodiment, the waterproof member 24 is a waterproof plate with uneven thickness, and the thickness of a part of the waterproof member 24 at the exposed hole 222 is less than or equal to that of a part of the waterproof member 24 outside the exposed hole 222. By configuring the waterproof member 24 to be thin at the exposed hole 222, during abnormal overheating conditions, the battery cell typically exhibits high-pressure and high-temperature jet fires at the first battery cell end face 211. In such cases, an abnormal unit battery cell 21 can rapidly break the thin area of the waterproof layer, thereby providing a safe pressure relief mechanism that prevents impact on adjacent unit battery cells 21 or battery cell assemblies 2 and avoids cascading thermal runaway events. Referring to FIG. 4, in an embodiment, the waterproof member 24 has a positioning member 226, and the positioning member 226 is a positioning hole configured to fit with a positioning post arranged on the battery cell holder 22, where the positioning post has a size ranging from 1 mm to 10 mm, thereby enabling effective positioning.

In an embodiment, the waterproof member 24 has a positioning member 226, and the positioning member 226 is a positioning post with a size ranging from 0.5 mm to 2 mm and configured to fit with a positioning hole formed in the battery cell holder 22, where part or all of the positioning post is accommodated in the positioning hole.

In an embodiment, the waterproof member 24 is connected to the battery cell holder 22 through, but not limited to, a mortise-and-tenon engagement structure, welding, adhesive bonding, or similar methods, ensuring a secured fit.

The electrode holder 3 is provided with a terminal assembly 32 and a terminal mounting base 33, where the terminal assembly 32 is installed within the terminal mounting base 33, and the terminal mounting base 33 is configured to position the terminal assembly 32; the terminal mounting base 33 is fixedly connected to the control board, while the terminal assembly 32 is connected to the control device 4; and the terminal mounting base 33 is provided with a guide slot 331 for directing correct insertion of an electrode, preventing installation errors that could lead to short circuits, while also securing the electrode to ensure effective connection with the control device 4. The control device 4 is arranged on the battery cell holder 22 and includes a control board 41 and a connecting member 42, where the control board 41 at least includes a control module and a communication module, and is connected to the unit battery cell 21 via the connecting member 42 through the exposed hole 222 to enable communication and control functions; the control module is configured to regulate parameters such as voltage, current, and temperature within the battery pack to ensure safe and efficient system operation; and the communication module is configured to conduct data exchange with external devices to achieve monitoring of the battery pack's operating status.

Those skilled in the art will appreciate that the above embodiments are specific embodiments for implementing the present application, and in actual applications, various modifications may be made thereto in form and detail without departing from the spirit and scope of the present application.

What is claimed is:

1. A tool battery pack, comprising:
a housing assembly,
a battery cell assembly,
an electrode holder,
a control device, and
a waterproof layer, wherein
the housing assembly is configured to accommodate the battery cell assembly, the electrode holder, and the control device; the control device is connected to the electrode holder and the battery cell assembly; the battery cell assembly comprises a battery cell holder and a unit battery cell mounted on the battery cell holder, wherein the battery cell holder has a first end and a second end, with an exposed hole formed in the second end; the waterproof layer is arranged at the second end of the battery cell holder; and
the tool battery pack further comprises a waterproof member and a positioning member configured to connect the waterproof member to the battery cell holder, wherein the waterproof member is arranged at the second end of the battery cell holder and has a first end face away from the battery cell holder and a second end face closer to the battery cell holder, at least part of the waterproof layer is arranged between the second end face and the battery cell holder, and the second end face has a second convex face protruding toward an end face of the unit battery cell at the exposed hole.

2. The tool battery pack of claim 1, wherein
the first end face has a first convex face protruding toward the end face of the unit battery cell at the exposed hole.

3. The tool battery pack of claim 2, wherein
a distance B between the first convex face and the second end face is greater than 0.3 mm and less than or equal to 3 mm.

4. The tool battery pack of claim 1, wherein
the unit battery cell has a first battery cell end face and a second battery cell end face, wherein the first battery cell end face has a positive end face, and a distance A2 between the second convex face and the positive end face is greater than or equal to 0.1 mm.

5. The tool battery pack of claim 4, wherein
the distance A2 between the second convex face and the positive end face is greater than or equal to 0.1 mm and less than 2 mm.

6. The tool battery pack of claim 4, wherein
the distance A2 between the second convex face and the positive end face is greater than or equal to 0.3 mm and less than 1.2 mm.

7. The tool battery pack of claim 4, wherein
the positive end face is provided with a cap end face, and a distance A1 between the second convex face and the cap end face is greater than or equal to 0.1 mm.

8. The tool battery pack of claim 7, wherein
the distance A1 between the second convex face and the cap end face is greater than or equal to 0.1 mm and less than 2 mm.

9. The tool battery pack of claim 7, wherein
the distance A1 between the second convex face and the cap end face is greater than or equal to 0.5 mm and less than 1.5 mm.

10. The tool battery pack of claim 7, wherein
the distance A1 between the second convex face and the cap end face is greater than or equal to 0.3 mm and less than 1.2 mm.

11. The tool battery pack of claim 1, wherein
the waterproof member is made of a non-metal material with a thermal softening temperature higher than or equal to 90° C.

12. The tool battery pack of claim 11, wherein
the waterproof member is made of any one of acrylonitrile butadiene styrene, polycarbonate, polypropylene, polyethylene, polyamide, or glass fiber.

13. The tool battery pack of claim 1, wherein
the waterproof member has a thickness greater than or equal to 0.3 mm and less than or equal to 3 mm.

14. The tool battery pack of claim 13, wherein
the waterproof member is a waterproof plate with uneven thickness, and the thickness of a part of the waterproof member at the exposed hole is less than or equal to that of a part of the waterproof member outside the exposed hole.

15. The tool battery pack of claim 4, wherein
the first battery cell end face further comprises a negative end face; an isolating member is arranged between the negative end face and the positive end face; and a first edge, which is an edge of the negative end face closer to a central axis of the unit battery cell, is exposed from the exposed hole, and a projection distance C between the first edge and an inner edge of the exposed hole is greater than or equal to 0.1 mm.

16. The tool battery pack of claim 1, wherein
an inner height D of the exposed hole is greater than or equal to 0.5 mm and less than or equal to 2.5 mm.

17. The tool battery pack of claim 16, wherein
the battery cell holder is provided with an accommodating slot; the exposed hole extending through the battery cell holder is formed at an end of the accommodating slot; an inner area of the exposed hole is less than a cross-sectional area of the accommodating slot parallel to the exposed hole; and an area of the exposed hole is less than a maximum area of the first battery cell end face extending into the accommodating slot.

18. The tool battery pack of claim 1, wherein
the waterproof layer is arranged at the second end of the battery cell holder through either a potting process or a vacuum deposition process, and covers the first and second battery cell end faces of the unit battery cell.

19. The tool battery pack of claim 1, wherein
the positioning member is a positioning hole, and the battery cell holder is provided with a positioning post configured to fit with the positioning hole, wherein the positioning post has a size ranging from 1 mm to 10 mm.

20. The tool battery pack of claim 1, wherein
the positioning member is a positioning post with a size ranging from 0.5 mm to 2 mm, and the battery cell holder is provided with a positioning hole configured to fit with the positioning post, wherein part or all of the positioning post is accommodated in the positioning hole.

* * * * *